United States Patent
Tomel, Jr.

(10) Patent No.: US 6,692,835 B1
(45) Date of Patent: Feb. 17, 2004

(54) INNERWRAP WITH POLYVINYL ALCOHOL SLIP COATING

(75) Inventor: John Joseph Tomel, Jr., Mocksville, NC (US)

(73) Assignee: R. J. Reynolds Tobacco Company, Winston-Salem, NC (US)

( * ) Notice: Subject to any disclaimer, the term of this patent is extended or adjusted under 35 U.S.C. 154(b) by 0 days.

(21) Appl. No.: 09/662,107

(22) Filed: Sep. 14, 2000

(51) Int. Cl.⁷ .................. B32B 15/08; B32B 15/12; A24B 3/14
(52) U.S. Cl. ............... 428/463; 131/358; 131/365; 206/268; 206/271; 206/273; 428/461; 428/464; 428/514; 428/522; 428/537.5; 428/905; 428/906
(58) Field of Search .................. 131/358, 365; 206/268, 271, 273; 428/461, 463, 464, 905, 906, 514, 522, 537.5

(56) References Cited

U.S. PATENT DOCUMENTS

| | | | |
|---|---|---|---|
| 2,007,632 A | 7/1935 | Blank et al. | 131/55 |
| 3,105,499 A | 10/1963 | Canan | 131/133 |
| 3,906,893 A | 9/1975 | Scales | 118/63 |
| 4,068,614 A | 1/1978 | Kopachkov | 118/6 |
| 4,303,155 A | * 12/1981 | Focke et al. | 206/264 |
| 4,717,017 A | 1/1988 | Sprinkel, Jr. et al. | 206/264 |
| 4,984,589 A | 1/1991 | Riedesser | 131/365 |
| 5,249,676 A | 10/1993 | Ashcraft et al. | 206/264 |
| 5,396,909 A | 3/1995 | Gentry et al. | 131/332 |
| 5,482,768 A | 1/1996 | Kawasato et al. | 428/327 |
| 5,938,018 A | 8/1999 | Keaveney et al. | 206/261 |
| 5,981,011 A | * 11/1999 | Overcash et al. | 428/40.9 |

FOREIGN PATENT DOCUMENTS

| | | |
|---|---|---|
| CA | 899172 | 5/1972 |
| DE | 1959102 | 5/1971 |

* cited by examiner

Primary Examiner—D. S. Nakarani
(74) Attorney, Agent, or Firm—Brinks Hofer Gilson & Lione

(57) ABSTRACT

Polyvinyl alcohol (PVOH) is used as a slip coating on a cigarette package innerwrap to prevent the innerwrap from sticking to the rollers of cigarette packaging machinery during processing of the innerwrap material. PVOH unexpectedly has a low retention of menthol, as compared to conventional slip coating materials, which also makes it useful in mentholation processes that involve applying menthol to the innerwrap rather than to the cigarettes per se.

17 Claims, No Drawings

INNERWRAP WITH POLYVINYL ALCOHOL SLIP COATING

FIELD OF THE INVENTION

The present invention relates to slip coatings for the foil layer of an innerwrap material for cigarette packages and more particularly to a polyvinyl alcohol (PVOH) slip coating.

BACKGROUND OF THE INVENTION

In cigarette packaging, it is conventional to wrap the bundle of cigarettes of a package in a sheet material known as an "innerwrap" which almost always includes a layer of paper for strength, a layer of metal foil to inhibit loss of moisture content of the cigarettes, and an adhesive to bond the foil and paper into a single sheet or laminate. The thus-wrapped cigarettes are then placed in a soft pack or a paperboard box, as the case may be, and overwrapped with a clear plastic sheet material, such as a polypropylene or polyethylene terephthalate film.

The innerwrap sheet material is typically made on laminating machines and wound up into large rolls for subsequent use. In the cigarette packaging plant, the innerwrap is unrolled, cut, and wrapped about bundles of cigarettes to be packaged in individual packs.

It is also conventional in cigarette making to make cigarettes flavored with menthol or other flavorants. In the case of a menthol flavorant, menthol can be sprayed onto or otherwise added to shredded tobacco and cigarettes can then be made from the mentholated shredded tobacco in the usual way. This is a practical method for manufacturing large quantities of menthol cigarettes in machines dedicated to producing only menthol cigarettes, but is impractical in the case of cigarette making machines, e.g., in smaller manufacturing plants, which may be used to manufacture non-flavored cigarettes as well as mentholated cigarettes. In such plants, the mentholated tobacco permeates the cigarette manufacturing equipment with the menthol flavorant which is difficult to remove from the equipment, so that an unintended menthol scent and/or taste is imparted to cigarettes subsequently made on the same equipment, even when regular, unflavored tobacco is used.

To avoid the problem of menthol-tainted machinery and to provide a way to permit cigarette manufacturing plants to make both flavored and non-flavored cigarettes on the same machinery, it is more advantageous to incorporate the menthol or other flavorant into the paper on the inner side of the innerwrap. Since menthol has a high vapor pressure, after a bundle of cigarettes is wrapped in a completed package, the menthol will diffuse into the tobacco of the cigarettes wrapped inside the innerwrap envelope, thereby imparting the desired menthol taste and aroma to the cigarettes. Typically, menthol is applied to the innerwrap at a location other than at the cigarette making machinery because the application of menthol to the innerwrap, e.g., by spraying, while simultaneously unrolling, cutting, folding, and wrapping the innerwrap about the cigarette bundles is impractical and can still result in menthol contamination of the cigarette making machinery.

Because the foil of the sheet material innerwrap is usually aluminum, and aluminum is a metal notorious for its poor bearing qualities, including a high coefficient of friction and a tendency to gall, in most cases the innerwrap must be coated on the foil side with a polymeric "slip coating," which prevents the foil side from adhering to the rollers of the cigarette making machinery and tearing the innerwrap web. In conventional innerwraps, the slip coating is a polyacrylate or a polyester, relatively expensive polymers. Although the slip coating is thin, because of the large production volumes, the total quantity and cost of the slip coating over time can be very high.

During the time the innerwrap is being stored and shipped to the cigarette manufacturing plant in rolls of the innerwrap material, there is an inevitable loss of menthol through sublimation and vaporization of the menthol flavorant. This loss is minimal because of the large volume-to-surface ratio of the roll. Menthol loss from the roll can be further reduced by wrapping the rolls in a vapor barrier.

Most of the menthol will be lost when the innerwrap is unwound from the large roll. When the roll is unwound, menthol on the paper will immediately begin to escape as vapor. This loss can be minimized by minimizing the time between unrolling the innerwrap material and wrapping the cigarette bundles. Ordinarily, this time will be short and the menthol loss slight. One loss that cannot be minimized is the loss of menthol from the slip-coated side of the innerwrap. Only the menthol on the paper side of the innerwrap will diffuse into the cigarettes. On the other hand, menthol on the slip coating side of the innerwrap cannot pass through the foil into the paper or cigarettes and will, therefore, diffuse through the paperboard box or soft pack wrapping and the outer polypropylene overwrap clear plastic.

When the innerwrap is rolled up, the menthol can readily diffuse from the paper into the slip coating, and the menthol will quickly reach an equilibrium in which a definite proportion of the menthol is retained in the slip coating. That proportion will ultimately not be in the cigarettes and will be wasted, except to the extent it imparts a menthol aroma to the consumer externally of the package. The menthol-affinity properties of the slip coating are thus important in affecting the amount of menthol that will be available to diffuse into the cigarettes and the amount that will be lost to the surrounding environment. Although the total surface area of the fibrous paper is much larger than the surface area of the smooth foil, a substantial amount of menthol still diffuses into or adheres to the conventional polymer slip coatings.

Polyvinyl alcohol (PVOH) has previously been used in the cigarette making art as an adhesive, for example, in making cigarette filters, but not, insofar as is known, as an innerwrap slip coating. U.S. Pat. No. 4,984,589 to Riedesser refers to GB-A-21 43 150 as disclosing a cigarette paper (tubular tobacco wrapper) coated on the side confronting the tobacco with polyvinyl acetate (PVA) or polyvinyl alcohol (PVOH) to prevent the penetration of condensate or tar that could form brown spots on the cigarette paper.

Thus, it would be desirable to minimize the amount of menthol that diffuses into or adheres to the slip coating during the time a cigarette innerwrap sheet material is stored. It would also be desirable to provide a low cost, yet effective, slip coating to replace the more expensive conventional slip coatings for cigarette package innerwraps.

SUMMARY OF THE INVENTION

The present invention relates to a cigarette package innerwrap having a polyvinyl alcohol (PVOH) slip coating. It has been found that PVOH is not only less expensive than conventional slip coating materials, it also has a relatively low coefficient of friction comparable to conventional slip coatings which makes it very effective in reducing the sticking of the aluminum foil of the innerwrap to the cigarette machinery rollers. In addition, as explained in more detail hereinafter, it has been unexpectedly found that PVOH is more effective than conventional slip coating materials in preserving the mentholation of packaged cigarettes by means of a menthol coating on the innerwrap paper.

On the basis of the chemical structure of PVOH, it would be expected that menthol would readily dissolve in PVOH and therefore that the amount of menthol lost to the slip coating of the innerwrap would be even greater with a PVOH slip coating than with conventional slip coating materials. However, contrary to the expectations of those skilled in the art, PVOH has a relatively low affinity for menthol. It has been unexpectedly found that the amount of menthol lost to the slip coating is less with a PVOH slip coating than with the prior art polyacrylate and polyester slip coatings.

Although the invention is not intended to be limited thereby, it is believed that the reason for this unexpected result is that the menthol does not dissolve in or adhere to the PVOH to the same degree that it does in the prior art slip coatings. The precise relationship between PVOH and menthol, as to their chemical affinity (adherence, solubility, etc.) or their other interactions that may explain the unexpected result of the present invention is not known.

With the foregoing and other objectives, features and advantages of the invention that will become hereinafter apparent, the invention may be more clearly understood by reference to the following detailed description of the invention and the appended claims.

DETAILED DESCRIPTION OF THE PREFERRED EMBODIMENTS

The present invention is directed to an innerwrap for cigarettes comprising a paper layer adhesively bonded (laminated) to a foil layer, such as an aluminum foil layer, and a polyvinyl alcohol slip coating on the foil layer. One form of the innerwrap structure consists of a 25 pound paper stock adhesively bonded with a silicate adhesive to a 0.00025 mil thick aluminum foil to which a PVOH slip coating is applied. The preferred method of applying the slip coating is to coat the foil layer with an aqueous solution of PVOH, allow the water evaporate, thereby leaving the PVOH on the foil layer as a slip coating.

The preferred PVOH coating composition comprises a 87.0% to 99.5% hydrolyzed, most preferably a 98.0% to 98.8% hydrolyzed polyvinyl alcohol resin with a molecular weight between 13,000 and 186,000 in an aqueous solution of about 1% to about 5% by weight of the polyvinyl alcohol resin. Because polyvinyl alcohol has a tendency to generate foam, a conventional defoaming agent is preferably added at a level of 0.1% to 0.3% by weight of the total weight of polyvinyl alcohol in the solution. A surfactant may is also preferably added to enhance surface wetting of the foil. A preservative may also added to increase the shelf life of the PVOH.

After the aluminum foil layer of the innerwrap is coated with the PVOH solution, the innerwrap is dried thoroughly and, in one aspect of the invention, the paper layer is coated with menthol or other flavorant. It will be understood that the term "coating," as used in the specification and claims herein, means covering a surface with a layer of a material by any means, for example, by printing, spraying, dipping, brushing, vapor deposition, or any other method. When the innerwrap paper layer has been coated with menthol, e.g., either by the conventional neat mentholation process or ethyl alcohol solution process, or by some other method, the innerwrap is immediately wound onto a large roll. Once the menthol coating is enclosed in the large innerwrap roll, the menthol cannot readily escape because the menthol molecules cannot diffuse through the foil layer on either side of the paper, but can escape only by diffusing through the paper to the marginal edges of the paper at the roll ends which are the only free surfaces available for escape. If desired, the roll may be packaged in a barrier layer material to further inhibit escape of the menthol flavorant from the roll ends during storage since diffusion of the menthol to the roll ends will reach an equilibrium condition with the menthol vapor in the package. In addition, some of the menthol in the paper will diffuse into or adhere to the slip coating on the foil layer underlying and adjacent to the paper also until an equilibrium condition is reached.

At some later time, the innerwrap material is removed from storage and used on cigarette packaging machinery to wrap cigarette bundles. At the time of use, a proportion of the menthol will reside in the paper, and the remaining proportion, except for what escaped from the roll ends, will have diffused into or adhered to and resides in the adjacent slip coating. In the finished cigarette package, the menthol remaining in the slip coating will, of course, eventually dissipate to the surrounding environment, while that remaining in the paper will, over time, diffuse into and spread evenly throughout the cigarette tobacco. Thus, it is desirable to minimize the amount of menthol remaining with the slip coating when the innerwrap is unrolled.

As explained above, it has been found that a relatively small proportion of menthol is retained by the slip coating on the innerwrap foil layer when the slip coating is PVOH, as compared to innerwraps with conventional slip coatings. Thus, a greater percentage of menthol remains in the paper layer of the innerwrap making possible a greater mentholation level for a given amount of menthol or the use of a lesser amount of menthol for a given mentholation level.

EXAMPLE

Two rolls of a PVOH-coated foil innerwrap were tested in a mentholation process. One roll was tested in a neat mentholation process and the other in an ethyl alcohol solution process. For the alcohol solution process on Roll #1, the innerwrap was run at 200 meters per minute with the solution flow control set at 600 ml/1000 meters which is the recommended setting to obtain a pack menthol target of 0.3% of net tobacco weight. For the neat process, Roll #2 was run at 200 meters per minute with the melt pump setting at 35% or 75 gm/min. For the same pack menthol target of 0.3% of net tobacco weight.

After completion of the mentholation process, both rolls were placed in a plastic bag and vacuum-sealed. The test foil innerwraps were then run on a cigarette packer approximately 2–3 hours later. There was little or no menthol crystal buildup on the foil coating. The rolls ran well on the packers with no machine problems.

The cigarette samples produced were tested for menthol content of the tobacco. Cigarettes packaged in innerwraps from both Rolls #1 and #2 were measured at 0.34% menthol by weight.

Additional tests of the PVOH coated innerwrap at different levels of pack menthol show the level of pack menthol is higher than the target menthol in the pack in both the neat mentholation process and the ethyl alcohol solution process. The results of those additional tests are tabulated in the following Table.

TABLE

| Test ID No. | GN20889AB | GN20889AG | GN20889AE | GN20889AD | GN20889AF | GN20889AC | GN20889AA |
|---|---|---|---|---|---|---|---|
| Flow Setting* | 580 | 580 | 33.5 | 44.7 | 770 | 999 | 63.3 |
| Neat or Alcohol | Alcohol | Alcohol | Neat | Neat | Alcohol | Alcohol | Neat |
| General Comments | Current CP 10's | PVOH Coated | PVOH Coated | PVOH Coated | PVOH Coated | PVOH Coated | PVOH Coated |
| Target Menthol % | 0.45 | 0.45 | 0.45 | 0.6 | 0.6 | 0.78 | 0.85 |
| Test Menthol % | 0.48 | 0.62 | 0.51 | 0.66 | 0.63 | 0.84 | 0.9 |

*Flow setting for the alcohol solution process in ml/1000 meters and for the neat process in gm/minute.

Although certain presently preferred embodiments of the invention have been specifically described herein, it will be apparent to those skilled in the art to which the invention pertains that variations and modifications of the various embodiments shown and described herein may be made without departing from the spirit and scope of the invention. Accordingly, it is intended that the invention be limited only to the extent required by the appended claims and the applicable rules of law.

What is claimed is:

1. In a cigarette innerwrap comprising a foil layer bonded to a paper layer including a menthol flavorant, and a slip coating on and in direct contact with the foil layer, the improvement wherein the slip coating comprises polyvinyl alcohol.

2. The innerwrap according to claim 1, wherein the polyvinyl alcohol is 87.0% to 99.5% hydrolyzed.

3. The innerwrap according to claim 2, wherein the polyvinyl alcohol is 98.0% to 98.8% hydrolyzed.

4. The innerwrap according to claim 1, wherein the foil layer is aluminum foil.

5. The innerwrap according to claim 1, wherein the foil layer is a metal foil.

6. A wrapping material comprising a foil layer bonded to a paper layer including a menthol flavorant, and a polyvinyl alcohol slip coating on the foil layer, wherein the wrapping material is wound upon itself into a roll.

7. The wrapping material of claim 6, wherein the polyvinyl alcohol is 87.0% to 99.5% hydrolyzed.

8. The wrapping material of claim 6, wherein the polyvinyl alcohol is 98.0% to 98.8% hydrolyzed.

9. The wrapping material of claim 6, wherein the foil layer is aluminum foil.

10. The wrapping material according to claim 6, wherein the foil layer is a metal foil.

11. The wrapping material of claim 6, wherein the slip coating is in direct contact with the foil layer.

12. A wrapping material comprising a foil layer bonded to a paper layer, and a polyvinyl alcohol slip coating on the foil layer, wherein the paper layer includes a menthol flavorant.

13. The wrapping material of claim 12, wherein the polyvinyl alcohol is 87.0% to 99.5% hydrolyzed.

14. The wrapping material of claim 12, wherein the polyvinyl alcohol is 98.0% to 98.8% hydrolyzed.

15. The wrapping material of claim 12, wherein the foil layer is aluminum foil.

16. The wrapping material of claim 12, wherein the foil layer is a metal foil.

17. The wrapping material of claim 12, wherein the slip coating is in direct contact with the foil layer.

* * * * *